United States Patent [19]
Ludgate et al.

[11] Patent Number: 6,133,956
[45] Date of Patent: Oct. 17, 2000

[54] DUAL STANDARD VIDEO SIGNALS PROCESSOR

[75] Inventors: Michael John Ludgate; Jonathan Mark Greenwood, both of Basingstoke; Mark John McGrath, Bracknell, all of United Kingdom

[73] Assignees: Sony Corporation, Tokyo, Japan; Sony United Kingdom Limited, Weybridge, United Kingdom

[21] Appl. No.: 08/826,655

[22] Filed: Apr. 7, 1997

[30] Foreign Application Priority Data

Apr. 11, 1996 [GB] United Kingdom .................... 9607519

[51] Int. Cl.[7] ........................................................ H04N 7/01
[52] U.S. Cl. .......................... 348/458; 348/441; 348/445; 348/581; 348/704
[58] Field of Search .................................... 348/441, 458, 348/459, 445, 443, 568, 454, 581, 704, 449, 446, 448, 455; 382/166, 232; H04N 7/01

[56] References Cited

U.S. PATENT DOCUMENTS

| | | | |
|---|---|---|---|
| 3,742,135 | 6/1973 | Baldwin | 348/458 |
| 4,610,026 | 9/1986 | Tabata et al. | 382/300 |
| 4,658,284 | 4/1987 | Kawamura et al. | 348/458 |
| 4,694,337 | 9/1987 | Lyons | 348/458 |
| 4,751,573 | 6/1988 | Kubota | 348/458 |
| 5,325,131 | 6/1994 | Penney | 348/706 |
| 5,327,235 | 7/1994 | Richards | 348/441 |
| 5,343,299 | 8/1994 | Ishikawa | 348/445 |
| 5,381,183 | 1/1995 | Ishizuka et al. | 348/458 |
| 5,410,357 | 4/1995 | Rieger et al. | 348/458 |
| 5,473,382 | 12/1995 | Nohmi et al. | 348/448 |
| 5,475,442 | 12/1995 | Matsushita et al. | 348/554 |
| 5,497,198 | 3/1996 | Kim | 348/445 |
| 5,534,934 | 7/1996 | Katsumata et al. | 348/445 |
| 5,642,169 | 6/1997 | Yamamoto et al. | 348/445 |
| 5,812,210 | 9/1998 | Arai et al. | 348/555 |
| 5,822,009 | 10/1998 | keating et al. | 348/458 |
| 5,828,415 | 10/1998 | Keating et al. | 348/458 |
| 5,835,151 | 11/1998 | Sun et al. | 348/441 |

*Primary Examiner*—Michael H. Lee
*Assistant Examiner*—Jean W. Desir
*Attorney, Agent, or Firm*—Frommer Lawrence & Haug, LLP; William S. Frommer

[57] ABSTRACT

A video signal processor interpolating lines in a vertical filter (24) in dependence on whether the lines are of a 625 line frame or a 525 line frame. The interpolated lines are filtered in a horizontal filter (26). The resultant lines are vertically and horizontally decimated by controlling the writing of the lines into a FIFO (28). A reduced size image is produced which has the same number of lines and pixels per line for both 525 and 625 line frames. The reduced size image is data compressed in a JPEG codec (50). The compression factor for a 525/60 signal is 6/5 of that for a 625/50 signal so the data rate per unit time is the same for both signals.

11 Claims, 6 Drawing Sheets

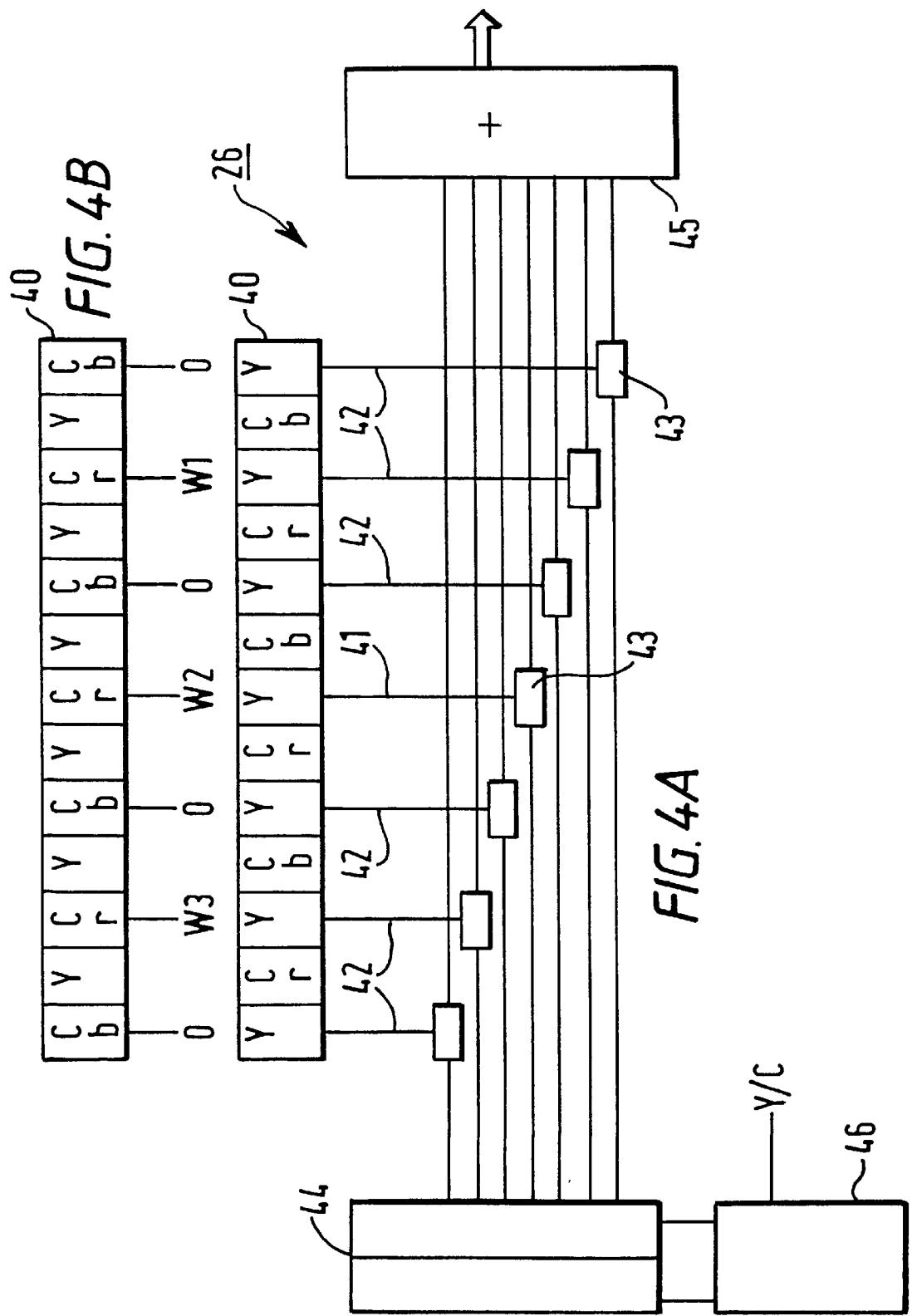

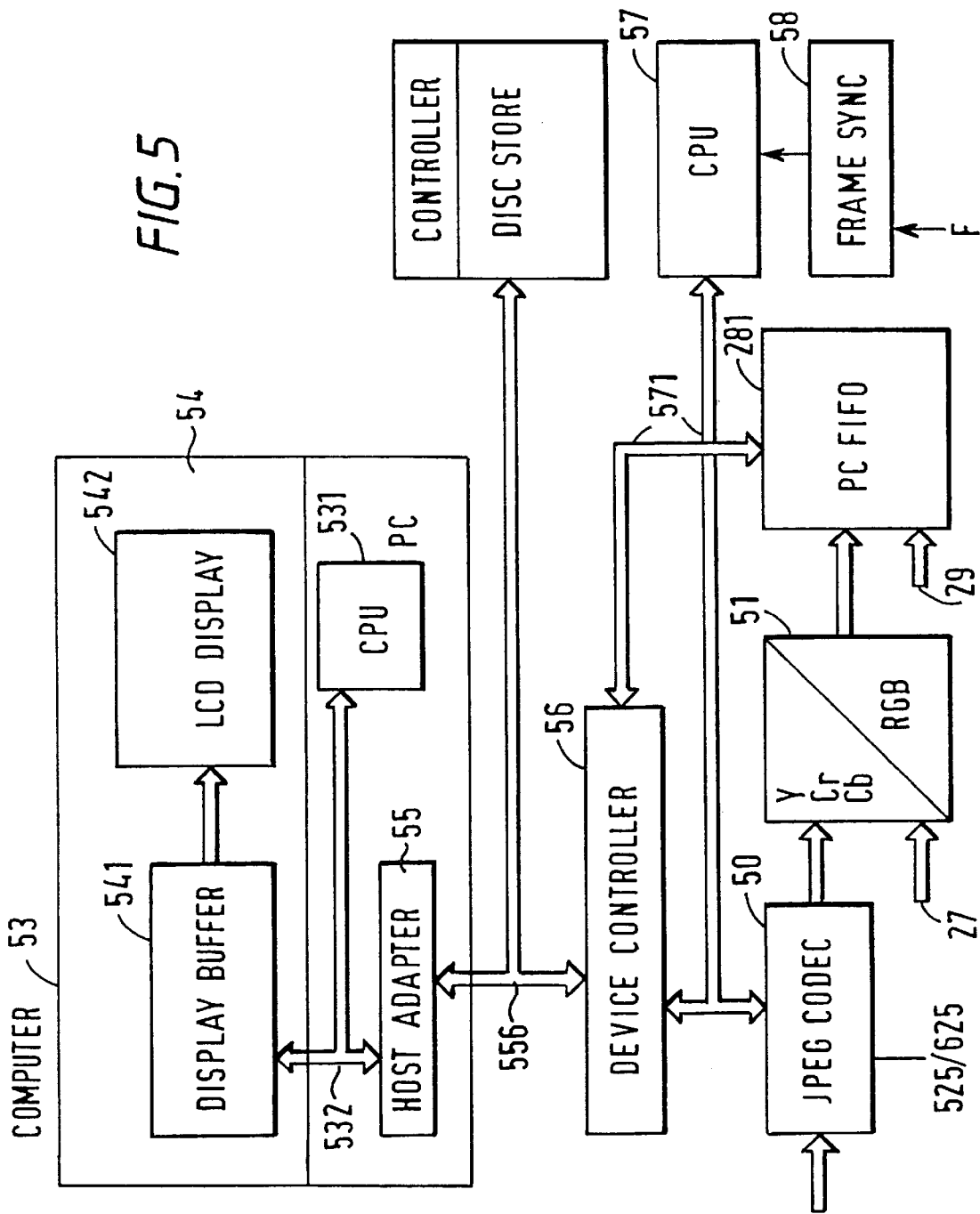

DUAL STANDARD VIDEO SIGNALS PROCESSOR

BACKGROUND OF THE INVENTION

Field of the Invention

The present invention relates to a video signal processor for processing video signals for different standards. For example, the processor processes both signals having 525 lines per frame at a nominal frame rate of 30 frames per second such as NTSC signals and signals having 625 lines per frame at a nominal frame rate of 25 frames per second such as PAL signals.

Description of the Prior Art

It is known to reduce the number of lines and the number of pixels per line of video signals to display the image represented by the video signal. This may be done when the display such as an LCD display has insufficient resolution to display the original signal. Alternatively this may be done when it is desired to reduce the size of the image for display in for example in a small "window" on a high resolution display such as a CRT, or for display in a small "window" in an LCD display. There is a known standard "QCIF" for reduced size images. The standard defines images of 176×120 pixels for source material in the 525 standard; and 176×144 pixels for source material in the 625 standard.

The "QCIF" standard has the disadvantage for producing different aspect ratios both different from the usual 4:3 aspect ratio. "QCIF" produces 4.4:3 for 525; and 3.67:3 for 625.

SUMMARY OF THE INVENTION

According to the present invention, there is provided a video signal processor for processing first and second video signals, the first video signal having a first number of lines per frame and a first frame rate and the second video signal having a second number of lines per frame and a second frame rate, the processor comprising an input for receiving a video signal, means for producing a signal indicative of whether the video signal at the input is the first video signal or the second video signal and reducing means responsive to the indicative signal to reduce the number of lines per frame and number of pixels per line of the first signal by a first factor to produce a first reduced image and to reduce the number of lines per frame and number of pixels per line of the second signal by a second factor to produce a second reduced image the first and second factors being such that the number of lines per frame and number of pixels per line of the first and second reduced images are equal.

Thus, considering 525/60 and 625/50 signals, both types of signals are processed to provide identical aspect ratios which preferably at least approximate a standard 4:3 aspect ratio and have the same number of lines and pixels per line in each frame. A display displaying the reduced size image needs to accommodate only different frame rates when displaying the reduced size images. Furthermore, apart from the different frame rates, the storage requirements for storing each frame are the same for both standards simplifying the addressing and storage formats.

In an embodiment of the invention, the reduced size images are subject to data compression such as JPEG compression before being stored. Preferably, the data derived from a 525/60 signal is compressed by a factor 6/5 greater than data derived from a 625/50 signal so that the amount of data per unit time derived from both types of signal is the same, further simplifying storage requirements.

BRIEF DESCRIPTION OF THE DRAWINGS

The above, and other objects, features and advantages of this invention will be apparent from the following detailed description of illustrative embodiments which is to be read in connection with the accompanying drawings.

FIGS. 4A and 4B are schematic diagrams of a horizontal filter of the processor of FIG. 2; and FIG. 5 is a schematic block diagram of a video display in accordance with another aspect of the invention.

DESCRIPTION OF THE PREFERRED EMBODIMENTS

Figure 1:
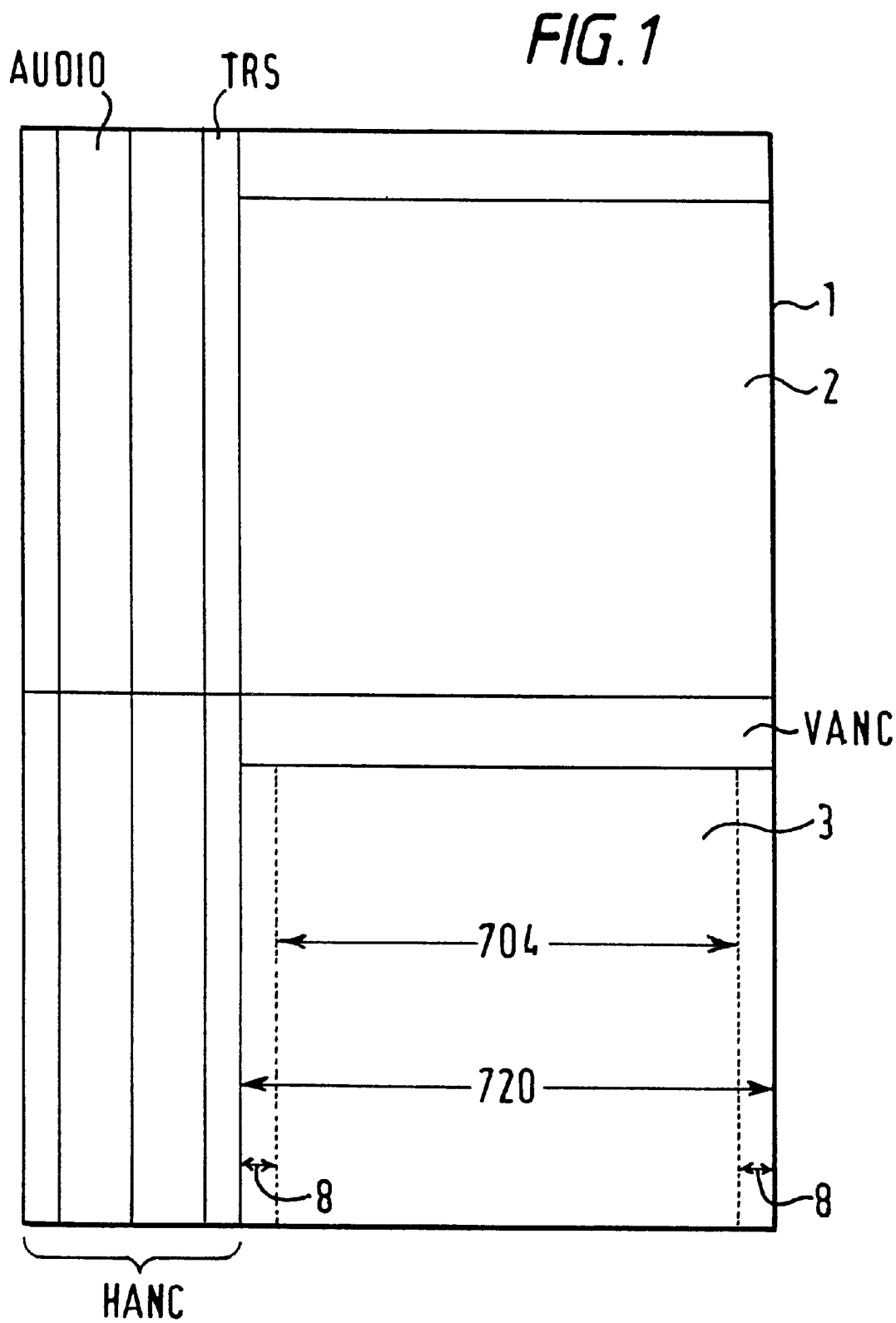
FIG. 1 is a diagram illustrating the format of a frame of SDI video and audio data.

Referring to FIG. 1 there is shown a frame of 4:2:2 component video and audio data conforming to the known SDI standard. The frame 1 comprises two fields 2 and 3. For 525 lines, 60 fields per second video there are 262 lines in field 1 and 263 lines in field 2. For 625 line 50 field per second video there are 312 lines in field 1 and 313 lines in field 2. As shown in the second field 3 of FIG. 1 each field comprises vertical ancillary data VANC in the vertical blanking interval. The active video area comprises 243 lines for a 525 field or 288 lines for a 625 field. Each line in the active area comprises horizontal ancillary data HANC and active video. The HANC includes a timing reference signal TRS. The timing reference signals include signals F, V and H of which F indicates the boundary of a field;

V indicates the active picture area vertically; and

H indicates the active picture area horizontally.

The active line interval for 4:2:2 component video for both 525 and 625 comprises 1440 samples per line, made up of 720 luminance samples and 720 chrominance samples. In the present embodiment of the invention the central 704 samples are used to produce a reduced size image for display. The first and last 8 samples of each line interval are not used to produce the reduced size image.

In the SDI standard there are 27 M samples per second of data, each sample being ten bits. The bits are transmitted serially at a bit rate of 270 M bits per second.

The active video data comprises luminance components Y interleaved alternately with chrominance components Cr, Cb:

Cr Y Cb Y Cr Y Cb Y etc.

In accordance with one aspect of the present invention it is desired to reduce the 720 samples per line and 487 active lines of 525/60 video signal to 176 samples per line and 136 lines per frame for display and to reduce the 720 samples per line and 576 active lines per frame of a 625/50 video signal to the same 176 samples per line and 136 lines per frame for display. In this way both 525/60 and 625/50 signals provide the same aspect ratio of 3.88:3.

Figure 2A:
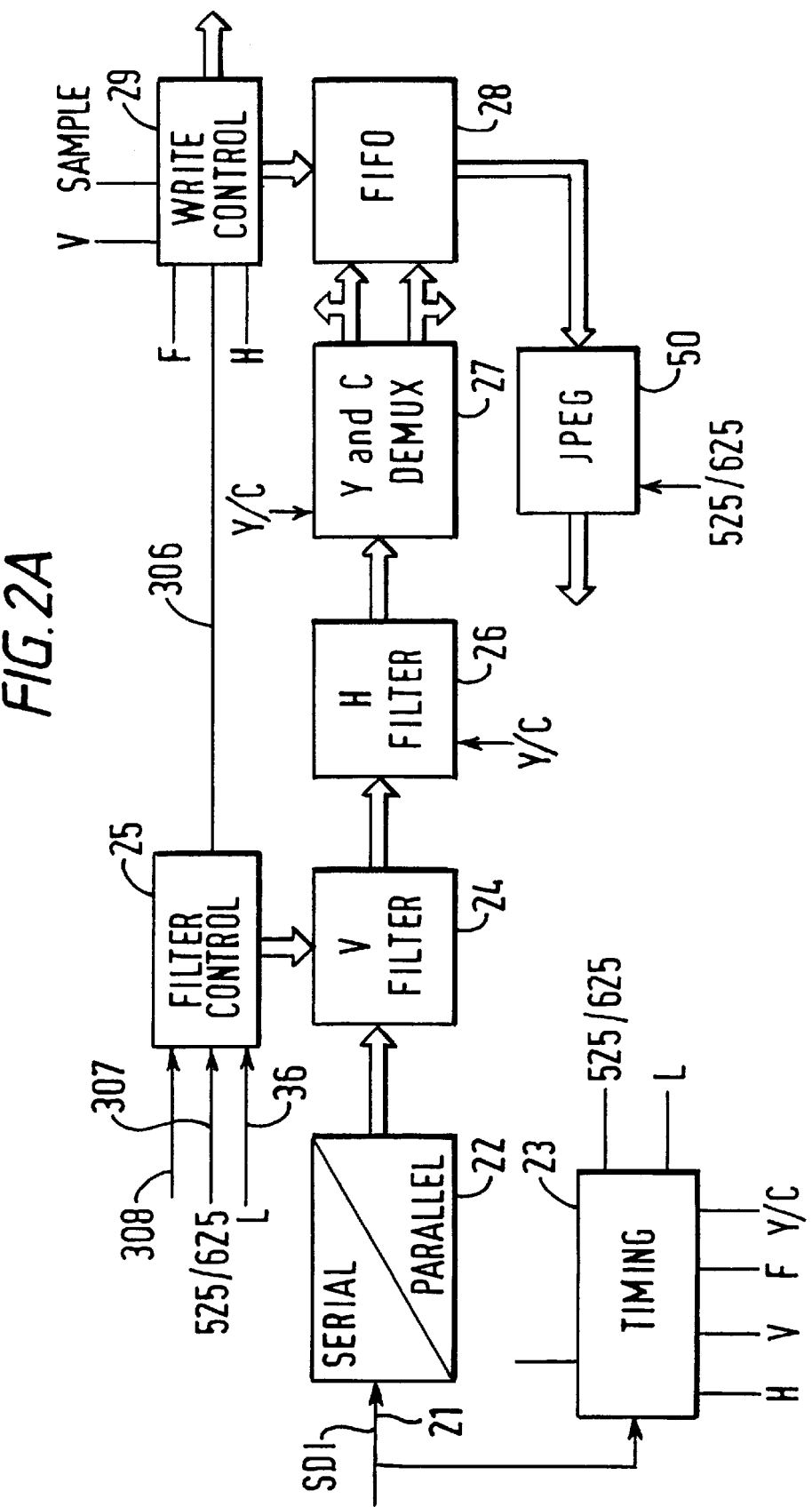
FIG. 2A is a schematic block diagram of a first part of a dual standard video signal processor in accordance with one aspect of the invention.

Referring to FIG. 2 the SDI video data is applied to an input 21 of a serial to parallel converter 22. The SDI data is also applied to a timing control circuit 23 which derives from the HANC the signals H, V and F. The timing control circuit also derives a signal L indicating the start of each active video line and a signal Y/C indicating the timing of the Y and C samples in each line. The Y/C signal is derived from the H signal because the first sample in every line is Crl. Furthermore, a signal 525/625 is derived by counting the number of lines in each frame. The timing circuit will not be further described because it is within the skill of those expert in this art to derive the signals H, V and F from the SDI data and to derive the Y/C, L and 525/625 signals from the SDI video data.

The serial to parallel converter, which is conventional in the art, converts the ten bit serial data to ten bit parallel data. The serial to parallel converter delivers to a vertical filter 24 all the SDI data on both fields including the HANlC and the VANC data.

As will be described in more detail with reference to FIG. 3 the vertical filter 24 together with the filter control circuit 25 vertically filter; the lines of data for anti-aliasing purposes prior to decimation, interpolates lines and controls the decimation process.

The vertical filtered data is delivered to a horizontal filter 26. The horizontal filter 26 applies a first anti-aliasing filter characteristic to the luminance components Y and a second anti-aliasing filter characteristic to the chrominance components C.

Figure 2B:
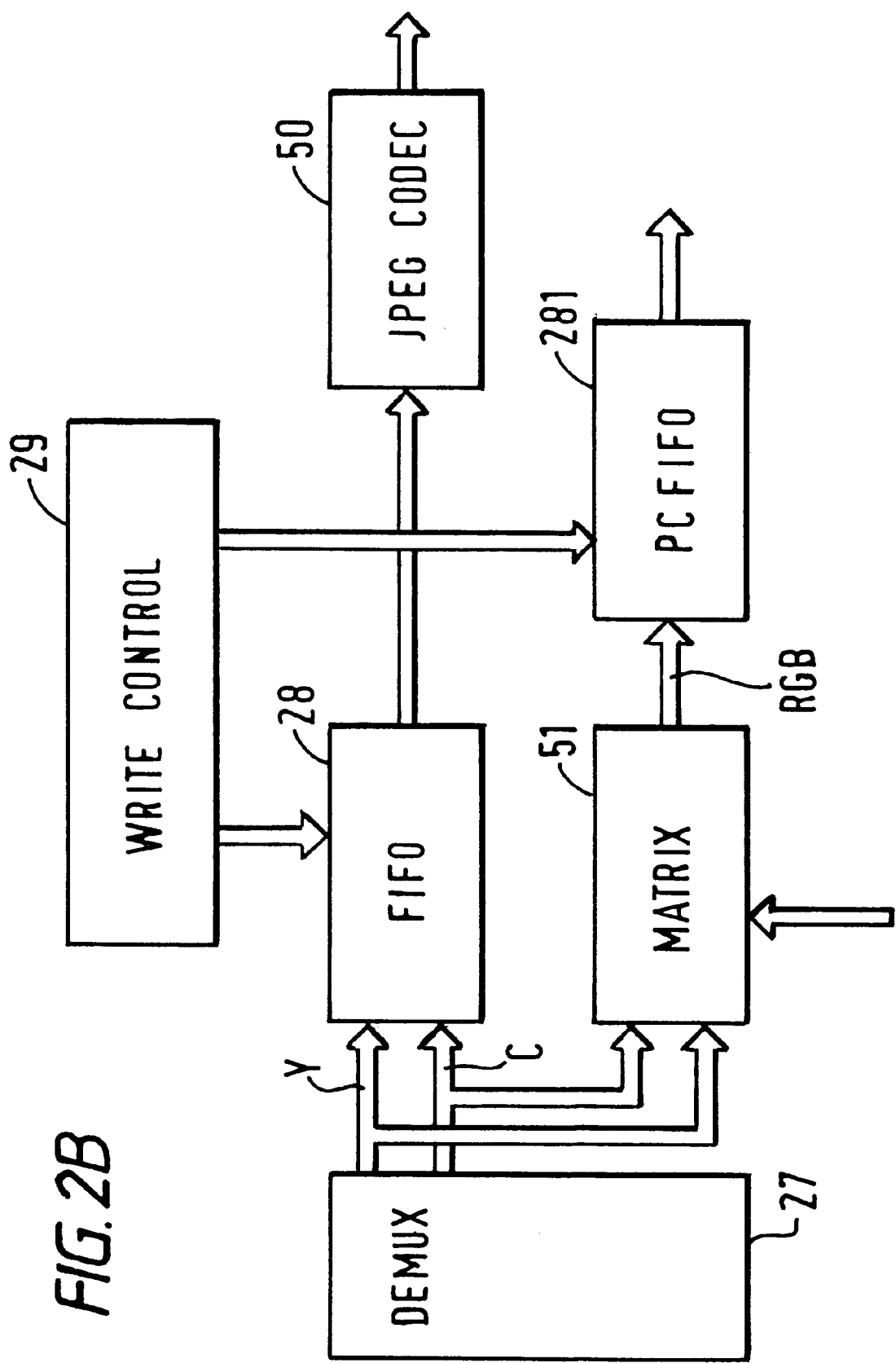
FIG. 2B is a schematic block diagram of a second part of the signal processor of FIG. 2A.

The vertically and horizontally filtered samples are delivered to a demultiplexer 27 which separates the filtered luminance and chrominance components into two separate data streams which are fed to: a first pair of FIFOs 28 (FIG. 2A) one for Y, one for C; and, via a matrix circuit 51, to a second pair of FIFO's 281 (FIG. 2B).

The pairs of FIFOs 28 and 281 act as the decimator under the control of a write control circuit 29.

The data supplied to the inputs of the pairs of FIFOs 28 and 281 comprises two whole fields of vertically and horizontally filtered data per frame interval including HANC and VANC data. The write control circuit 29 responds to the timing signal F representing fields to disable writing of data into the FIFOs for odd fields. Thus only even fields of data are written into the FIFOs 28 and 281.

The data at the input to the FIFOs 28 and 281 includes the VANC and HANC data. The write control circuit 29 responds to the timing control signal H representing active video horizontally and the timing signal V representing active video vertically to enable writing of only active video data into the FIFOs 28 and 281 excluding the HANC and VANC intervals. Thus only active video data is written into the FIFOs 28 and 281.

Only 704 samples of the 720 samples per line are used to derive the reduced size image. The write control circuit 29 responds to a line selection signal 306 indicating each line to be written and to the timing signal Y/C indicating the timing of samples on each line to:

1) disable writing of data into the FIFOs for the first and last eight luminance and chrominance samples of each line; and 2) write into the FIFOs only one out of every four of the remaining 704 active samples.

In this way all samples of each line interval are supplied to the FIFO but only 176 samples per line of each even numbered field are stored in the FIFOs. Also because the first and last eight luminance samples and the first and last eight chrominance samples of each active line are excluded, any effects from horizontally filtering the HANC on the active video are eliminated.

For 625/50 video there are 288 active lines per field. Only 136 lines are required, equivalent to a decimation factor of 2.12 as will be explained with reference to FIG. 3.

For a 525/60 image there are 243 active lines per field whereas only 136 lines are required in the reduced size image corresponding to a decimation factor of 1.79 as will be explained with reference to FIG. 3. The vertical decimation is provided by the write control circuit 29 which responds to a line selection signal provided by an output 306 of the filter control circuit 25 which selects interpolated lines for storage in the FIFOs 28 and 281 and thus for display in the reduced size image.

The video data comprising Y, Cb, Cr samples representing the reduced sized image is read out of the FIFOs 28 to a JPEG codec 50. Although the reduced size image data provided to the JPEG and derived from both 525 and 625 line images has the same number of lines per frame and the same number of samples per line, the data derived from the 525/60 signal has a field rate of 60 fields per second whereas the data derived from a 625/50 signal has 50 frames per second. Thus the data rate of the reduced size image derived from a 525/60 signal is greater than that derived from a 625/50 signal.

The data compressed signals in a presently preferred embodiment of the invention are stored in, for example, a disc storage device such as a magneto-optical disc. So that equal times of data compressed and decimated 625/50 and 525/60 signals may be stored the 525/60 signals are compressed by a factor 6/5 greater than the 625/50 signals.

Referring to FIG. 2B, on replay, the compressed data is decompressed in the JPEG codec 50, and then supplied to a matrix circuit 51 and converted to RGB signals and supplied to FIFO 281. Decimation is, obviously, disabled on replay. The data is read out synchronously with frame sync.

The Y, Cb, Cr samples are also fed directly from the demultiplexer 27 to the matrix circuit 51 where they are converted to RGB signals and Decimated in the FIFOs 281 for direct display. The manner in which the signals are displayed, in accordance with another aspect of the invention, will be described with reference to FIG. 5.

For a 625/50 signal it is desired to derive 136 lines of a reduced size image from 288 lines of the even numbered field of the original 625/50 signal. Thus it is desired to derive less than one line of the reduced size image for every 2 lines of a field of the 625/50 signal. The first line of the 136 lines of the reduced size image is identical to the first line of the 288. Thus (136-1) lines are derived from (288-1) giving a decimation factor of 2.12. If a line of the reduced image is interpolated from every 2 lines of the 287, then 143 lines are produced. By deleting every 18th of the 143 interpolated line, 8 interpolated lines are deleted giving 143−8=135 lines.

For a 525/60 signal 136 lines of the reduced image are derived from 263 lines. Again the first line of the 136 is identical to the first line of the 263. Thus (136-1) lines are derived from (243-1) giving a decimation ratio of 1.79. Interpolating one line for each pair of the 243 gives 131 lines. Thus 4 additional interpolated lines must be provided. Thus one extra line must be interpolated for every 33 of the 131 interpolated lines.

Figure 3:
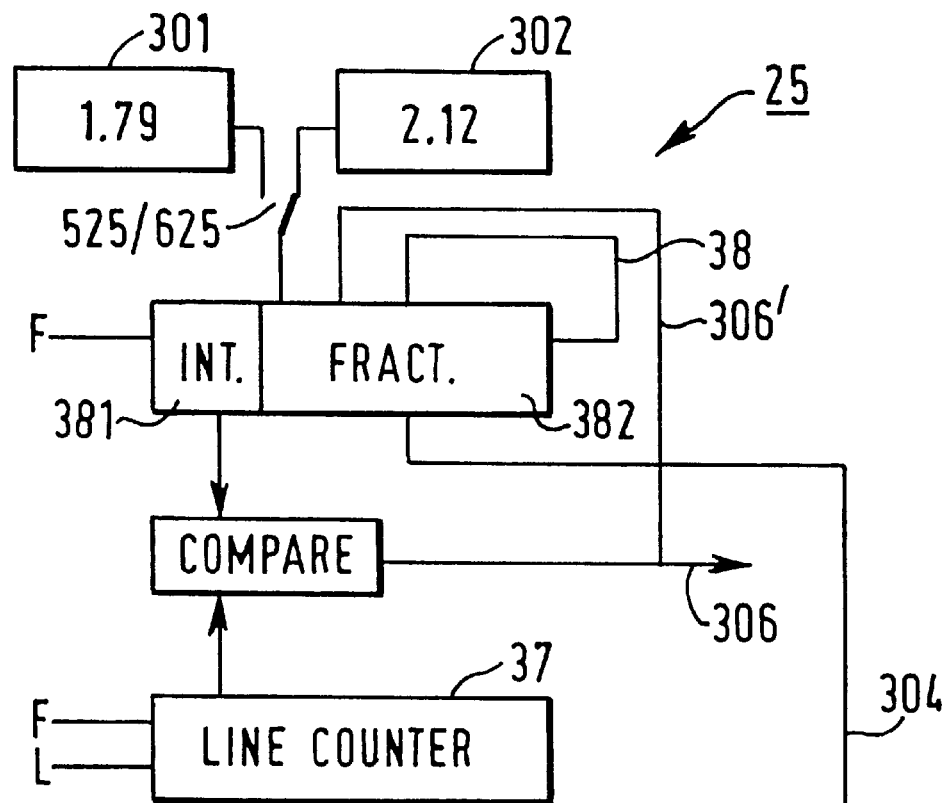
FIG. 3 is a schematic block diagram of a vertical filter and filter control circuit of the video signal processor of FIG. 2.
Figure 3:
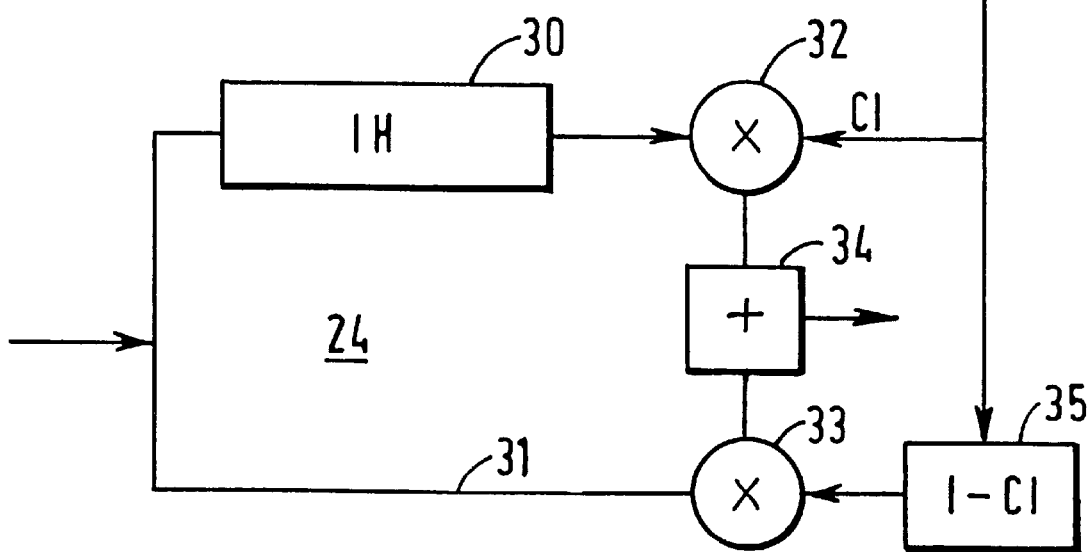

Referring to FIG. 3, the vertical filter 24 comprises a delay line 30 providing a delay of 1 line interval (IH), multipliers 32 and 33 and an adder 34. Samples delayed by the IH delay line 30 are fed to multiplier 32 and undelayed samples are fed to multiplier 33 via a connection 31.

The samples are weighted in the multipliers 32 and 33 by coefficients C1 and C2=(1−C1) and added in adder 34. The circuit outputs an interpolated line for every input line. For example it produces 288 interpolated active lines per field for a 625/50 input signal.

The coefficients C1 and C2 are derived from the filter control circuit 25 shown in FIG. 3.

The circuit 25 comprises a line counter 37 which is kept reset until the first active line of field 2 appears when it counts line pulses provided by the line timing signal L. An accumulator 38 comprises an integer part 381 (e.g. 9 bits) and a fractional part 382 (e.g. 12 bits).

The accumulator 38 is kept reset until the first active line of field 2 appears. The accumulator 38 is, for example maintained in a reset state contains all '1's, so that all the lines of the first field are interpolated by the same coefficients (C1) and (1−C1). The accumulator is then reset to zero at the first active line of field 2. Each time the accumulator is enabled via connection 306' it adds to its contents a preset number stored in a store 301 for 525/60 signals or a number stored in a store 302 for 625/50 signals. The numbers stored are the respective decimation factors 1.79 for 525/60 and 2.12 for 625/50.

The integer part of number in the accumulator 381, 38 is compared in a comparator 305 with the count in the line counter 37. If the integer numbers are unequal, a line deselect signal is output on connection 306. If the numbers are equal a line select signal is output on connection 306. The line select signal also enables the accumulator to add the preset number to its contents.

The fractional part of the number in the accumulator 382, 38 is the coefficient C1. C2 is derived from C1 by subtracting C1 from 1 in a circuit 35 which may be a subtracter. For the first line of a field C1=0, C2=1 and so the first line output by circuit 24 equals the first input line.

The horizontal filter 26 is a symmetrical FIR filter and is shown in FIGS. 4A and 4B. It comprises a tapped delay line 40. For convenience the line is shown as having 7 taps 41 and 42 of which 41 is the centre tap with taps 42 arranged symmetrically with respect to tap 41. The number of taps used is a matter of design choice within the skill of the expert in the art. The taps are connected to alternate stages of the delay line. The taps are connected to weighting circuits 43 which receive respective coefficients from a store 44. The weighted samples are summed in an adder 45.

The 4:2:2 component video comprises Y, Cr and Cb samples interleaved as shown in FIGS. 4A. The Y samples are shown present at tap central 41 and at the symmetric taps 42. For each group of 7Y samples centred around tap 41 a filtered Y sample is produced at the output of the adder. The 7 coefficients for filtering the Y samples are selected from the store 44 by a selector circuit under the control of the Y/C timing signal.

The Cr and Cb samples are weighted in groups of for example 3. Thus when a Cr and Cb sample is present at tap 41, all but 3 of the coefficients are set to zero as shown in FIG. 4B. The store 44 stores such a set of coefficients which are selected by the Y/C timing signal.

It will be recalled that all the data including the HANC is horizontally filtered. The unused 8 samples at each end of each active line prevent contamination by the HANC of the filtered video samples used to produce the reduced size image.

The demultiplexer and the matrix circuit are conventional circuits and require no further description.

Referring to FIG. 5, the reduced size images are displayed, in this illustrative embodiment of the invention, on an LCD display 542 of a computer, which in this example is an IBM Thinkpad (Trademark) laptop computer 53. The computer 53 comprises a CPU 531 and a bus 532 to which are connected a display driver 54 including a display buffer 541 and the LCD display 542.

The video signal processor of FIG. 2 comprises the JPEG codec 50, the matrix 51 and an image buffer store 281. The matrix 51 receives reduced size image data either directly from the demultiplexer 27 of FIG. 2 or from the codec 50. The codec 50 and the buffer 281 are coupled to a bus 571 and are controlled by a CPU 57 via the bus.

A source 58 of frame synchronisation (sync) signals is provided in the video signal processor. The source 58 provides the sync signals in response to an external synchronisation signal, (the SDI) or is free-running if SDI is not connected. The source 58 is connected to the CPU 57 to cause the buffer 281 to output the frames of the reduced size image synchronously with the frame sync signal.

The computer 53 has no source of frame sync signals.

The computer 53 is connected to the video signal processor by a SCSI-2 interface comprising a host adapter 55 connected to the bus 532 in the computer, a SCSI bus 556 and a device controller 56 connected to a bus 571 in the video signal processor.

The computer 53, in this example, displays alternate frames of the reduced size image because it is not sufficiently fast to display every frame. A faster computer would be able to display every frame. The computer 53 acting as a SCSI initiator issues to the video signal processor a command requesting the supply of a frame of reduced size image whenever it is ready to process and display the frame.

The command, which in this example is a vendor-specific SCSI command, is implemented by the video signal processor which acts as a SCSI target, and provides the frame synchronously with the frame sync signal. Thus the target controls the synchronisation of the initiator.

The SCSI-2 standard is defined in ANSI X3.131—1994 and is also described in books such as "*The SCSI Bus and IDE Interface*" by Friedholm Schmidt, published by Addison-Wesley ISBN 0-201-42284-0. Thus the details of the operation of the SCSI interface do not need to be described here.

The vendor specific command issued by the host adapter is implemented in the target.

In accordance with the SCSI-2 standard the command has the format

| Bit/Byte | 7 | 6 | 5 | 4 | 3 | 2 | 1 | 0 |
|---|---|---|---|---|---|---|---|---|
| 0 | Operation code VENDORCMD_NAME ||||||||
| 1 | Reserved 00h ||||||||
| 2 | Reserved 00h ||||||||
| 3, 4 | Allocation Length ||||||||
| 5 | Reserved 00h |||||||| where in byte 0, bits 7, 6 and 5 denote a vendor command i.e. SCSI command group 6, and bits 4, 3, 2, 1 and 0 identify the command. Bytes 3 and 4 denote the amount of data to be transferred from the target to the best.

The vendor command causes the target to a) disconnect from the bus which is a standard SCSI operation, and b) when the data is ready to be transferred to the computer c) reconnect the target to the bus after a frame sync signal. Reconnect is a standard SCSI operation.

The data transfer to the computer takes place at the beginning of alternate frames, in this example. Data transfer could take place at every frame if the computer could process the image data sufficiently quickly.

In regard to b), the processing of the image data to be transferred takes place independently of the SCSI command. The processing, in this example, takes place synchronously with frame sync. The target waits for the data to be ready for transfer.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A video signal processor for processing first and second video signals, the first video signal having a first number of lines per frame and a first frame rate and the second video signal having a second number of lines per frame and a second frame rate, the processor comprising:

an input for receiving a video signal, wherein said video signal is a digital signal consisting of active video data and other data;

indicating means for producing an indicator signal indicating whether said video signal at the input is the first video signal or the second video signal;

reducing means responsive to said indicator signal to reduce the number of lines per frame and number of pixels per line of the first signal by a first factor to produce a first reduced image and to reduce the number of lines per frame and number of pixels per line of the second signal by a second factor to produce a second reduced image said first and second factors being such that the number of lines per frame and number of pixels per line of the first and second reduced images are equal; said reducing being comprised of:

first processing means for processing the digital signal in a frame direction, the processing being dependent on the indicator signal;

second processing means for processing the digital signal in a line direction, the first and second processing means being arranged to process the whole digital signal consisting of the active video data and the other data; and selecting means for selecting from the whole processed digital signal the processed active video data which represents the reduced image; and an image data compressor responsive to the indicator signal for compressing the first reduced image by a first compression factor related to the first frame rate and the second reduced image by a second compression factor related to the second frame rate such that the first and second compressed images are represented by substantially equal amounts of data per unit time.

2. A processor according to claim 1, wherein said second processing means is a finite impulse response (FIR) filter.

3. A processor according to claim 1, wherein the first processing means produces weighted combinations of predetermined lines, including lines from the reduced images, according to weighting factors selected by the indicator signal.

4. A video signal processor for processing first and second video signals the first video signal having a first number of lines per frame and a first frame rate and the second video signal having a second number of lines per frame and a second frame rate, the processor comprising:

an input for receiving a video signal wherein the video signal is a digital signal consisting of active video data and other data;

means for producing a signal indicative of whether the video signal at the input is the first video signal or the second video signal; and reducing means responsive to the indicative signal to reduce the number of lines per frame and number of pixels per line of the first signal by a first factor to produce a first reduced image and to reduce the number of lines per frame and number of pixels per line of the second signal by a second factor to produce a second reduced image, the first and second factors being such that the number of lines per frame and number of pixels per line of the first and second reduced images are equal; said reducing means being comprised of:

first means for processing the digital signal in a frame direction, the processing being dependent on the indicative signal and producing weighted combinations of lines, predetermined ones of which are lines of the reduced image, according to weighting factors selected by the indicative signal; wherein said first means comprises:

delay means for implementing delays of 1 line interval, a first weighting circuit for weighting delayed lines by a weighting factor C1, a second weighting circuit for weighting undelayed lines by a factor (1−C1), and means for adding the weighted delayed and undelayed lines;

second means for processing the digital signal in a line direction, the first and second processing means being arranged to process the whole digital signal consisting of the active video data and the other data; and selecting means for selecting from the whole processed digital signal the processed active video data which represents the reduced image.

5. A processor according to claim 4, comprising means for storing a first number representing a line reduction factor associated with a 625 line frame and a second number representing a line reduction factor associated with a 525 line frame, means responsive to the stored numbers for deriving the weighting factors and means for supplying the stored number to the deriving means in dependence on the indicative signal.

6. A processor according to claim 5, wherein the weighting factor deriving means comprises a line counter for counting video lines, a comparator, and an accumulator having a fractional part and an integer part and arranged to receive the stored number supplied in dependence on the indicative signal, the comparator producing a select signal when the line count in the line counter equals the count in the integer part of the accumulator, the accumulator being responsive to the select signal to increment the count therein by the supplied stored number, the fractional part being the weighting factor C1.

7. A processor according to claim 5 wherein the selecting means comprises a data store and write control means which enables writing into the store of the processed active video data representing the reduced image and disables writing of all other data.

8. A processor according to claim 7, wherein the digital signal includes data identifying the active video, and the write control means is responsive to the identifying data and the said select signal to enable writing of these processed active video lines coincident with the select signal.

9. A processor according to claim 8, wherein the write control means selectively enables writing of pixels of each line into the store to decimate the image data in the line direction.

10. A processor according to claim 9, wherein the said second means is an FIR filter.

11. A processor according to claim 10 wherein the write control means disables writing into the store of predetermined numbers of pixels at each end of each active video line interval, to reduce the effects of the said other data on the active video data due to the FIR filter.

* * * * *